United States Patent [19]

Stixrud et al.

[11] Patent Number: 4,562,554
[45] Date of Patent: Dec. 31, 1985

[54] UNIVERSAL MICROCOMPUTER FOR INDIVIDUAL SENSORS

[75] Inventors: Thomas E. Stixrud; Barbara Sotirin, both of San Diego, Calif.

[73] Assignee: The United States of America as represented by the Secretary of the Navy, Washington, D.C.

[21] Appl. No.: 502,797

[22] Filed: Jun. 9, 1983

[51] Int. Cl.[4] .................... G06F 15/00; G01K 00/00
[52] U.S. Cl. ................................ 364/900; 364/557
[58] Field of Search ... 364/200 MS File, 900 MS File, 364/551, 556, 557; 323/370, 371; 377/20, 25; 307/152, 153

[56] References Cited

U.S. PATENT DOCUMENTS

| | | | |
|---|---|---|---|
| 3,979,056 | 9/1976 | Barnes | 377/25 |
| 4,058,767 | 11/1977 | Muehldorf et al. | 324/73 R |
| 4,060,714 | 11/1977 | Lappington | 364/431.04 |
| 4,155,037 | 5/1979 | Mazur | 364/900 |
| 4,215,413 | 7/1980 | Stark et al. | 364/570 |
| 4,234,926 | 11/1980 | Wallace | 364/551 |
| 4,307,335 | 12/1981 | Paulson | 324/61 |
| 4,381,498 | 4/1983 | Goodale | 340/347 AD |
| 4,424,559 | 1/1984 | Lorincz | 364/131 |
| 4,463,436 | 7/1984 | Veneklase | 377/25 |
| 4,503,707 | 3/1985 | Rosa | 364/556 |
| 4,527,247 | 7/1985 | Kaiser | 364/557 |

Primary Examiner—James D. Thomas
Assistant Examiner—Florin Munteanu
Attorney, Agent, or Firm—Robert F. Beers; Ervin F. Johnston; Edmund W. Rusche, Jr.

[57] ABSTRACT

This invention is an apparatus and method created around a specialized microcomputer attachable to and addressable to each thermister in an array of thermisters used to measure temperature in the sea. The invention provides a number of options so that the same model of microcomputer can be adapted to several different modes of operation and used to monitor a variety of other sensors that have electrical resistance, voltage or current as outputs. Alternate modes of operation for resistive sensors are presented where a number that fixes the measurement as a fraction of the dynamic range of the variable being measured is determined. The system includes the circuits and memory needed to adapt it to any of a variety of sensors measuring physical quantities. The microcomputer contains a counter that can be incremented at several rates, a voltage comparator which can be used to interrupt the counter at a number that represents the measurement, input/output buffers for connections with a remote master control unit whereby command instructions and data can be relayed to and from the microcomputer, and a voltage reference source.

20 Claims, 8 Drawing Figures

UNIVERSAL MICROCOMPUTER FOR INDIVIDUAL SENSORS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Many sensor arrays have been assembled to transmit information about physical quantities such as temperature, pressure, force, velocity, chemical composition, sound intensity, vibration, etc. Such arrays are used in environmental mediums, production processes, operating machinery, and in living organisms. Most sensor arrays require a multitude of conductors, each to receive power and to transmit measurement data to complex signal processing and display equipment. Differing types of sensors have different operating powers, dynamic ranges, and outputs that can be electrical current, voltage, or resistance, and they have a wide range of output impedances. These variations require a corresponding variety of signal processing equipment. Some oceanographic sensor arrays have been developed that use inductive coupling of multiplex signals on common transmission lines which have reduced the bulk of the transmission lines but inceases the cost and complexity of the sensors. More modern systems have applied semiconductor technology to sensor arrays with some improvement in cost and bulk. Analog-to-digital converters which are used to convert sensor output voltages to digital counts already exist, but require additional semiconductor chips to provide addressing, serial or digital outputs, and control of the operation. Some microcomputers have analog-to-digital converters built in, but again require additional chips for unique addressing, and serial or parallel outputs, and they have a more limited capability than the chip to be described in this disclosure.

SUMMARY OF THE INVENTION

This invention presents a specialized microcomputer including the circuits and memory needed to adapt it to any of a variety of sensors measuring physical quantites. More specifically, it is a low cost specialized microcomputer that can be attached and dedicated to each sensor in an array of sensors. The dedicated microcomputer will have hard wire address and hard wired options with each sensor which adapt a given array to a variety of sensors and operational modes. Each microcomputer connected to its dedicated sensor is wired to a master control computer for receiving operational commands and transmitting recorded physical data from the sensors.

The microcomputer contains a ROM which is programmed so that when power comes on the system will monitor the data sensors according to the control commands, record and store measured data from the sensors, and transmit the recorded data when addressed by the master control unit. Key components of the microcomputer are a counter that can be incremented at several rates, and a voltage comparator which can be used to interrupt the counter at a number that represents the measurement value from the sensor. One optional method of operation for resistive type sensors results in a number that fixes the measurement as a fraction of the dynamic range of the physical variable being measured.

The specialized microcomputer is preprogrammed to perform any of several select methods of sensor measurements. It will monitor measurements from various sensors such as thermisters, voltage devices (thermocouples), capacitative devices, pressure sensitive devices, etc., according to prescribed commands.

OBJECTS OF THE INVENTION

An object of this invention is to provide a specialized microcomputer to be attached to individual sensors and methods of its operation for controlling the monitoring and relaying of the data from said sensor.

Another object of this invention is to provide a specialized microcomputer that can be adapted to different methods of operation and used to monitor a variety of sensors, such as sensors having electrical resistance, voltage or current as outputs.

A further object of this invention is to present an inexpensive, uniquely addressable microcomputer to be attached to each thermister in an array of thermisters used to measure temperature in the sea, so that the bulk, complexity and cost of the array can be reduced while measurement accuracy and versatility is improved.

Other objects, advantages and novel features of the invention will become apparent from the following detailed description of the invention when considered in conjunction with the accompanying drawings.

DESCRIPTION OF THE PREFERRED EMBODIMENT

Figure 1:
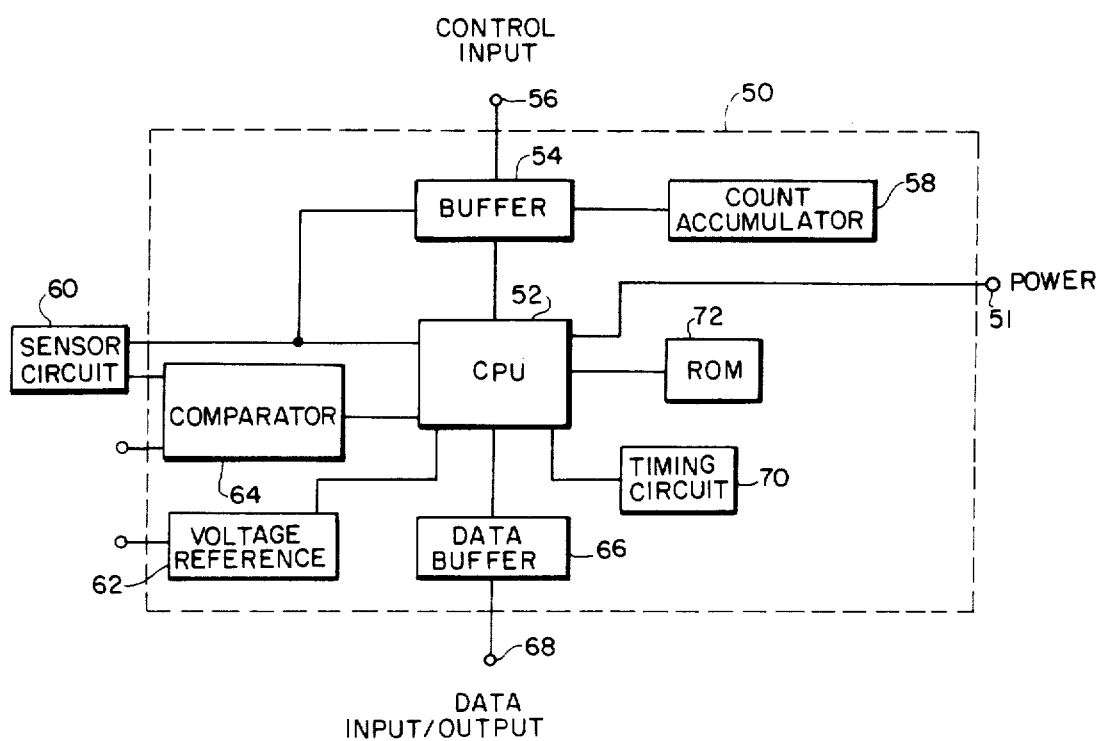
FIG. 1 shows a block diagram of the basic circuitry configuration for the microcomputer.

FIG. 1 is a block diagram showing the major components of the microcomputer circuitry. The microcomputer proper is identified as item 50. A central processing unit 52 is the heart of the system. A control input 56 enters buffer 54 which is connected to CPU 52. A power input 51 connects with the CPU. A count accumulator 58 is connected to buffer 54 and through the buffer to CPU 52. Comparator 64 is connected with its output to CPU 52. One input to comparator 64 is a connection from sensor circuit 60. The second input may be connected to a voltage reference 62. A ROM 72 is connected to CPU 52. In addition a clock 70 connected to CPU 52 provides timing control for the various operations. A data buffer 66 interfaces between CPU 52 and data input/output 68 for receiving the address from and transmission of the monitored data to a remote master control unit.

Figure 2:
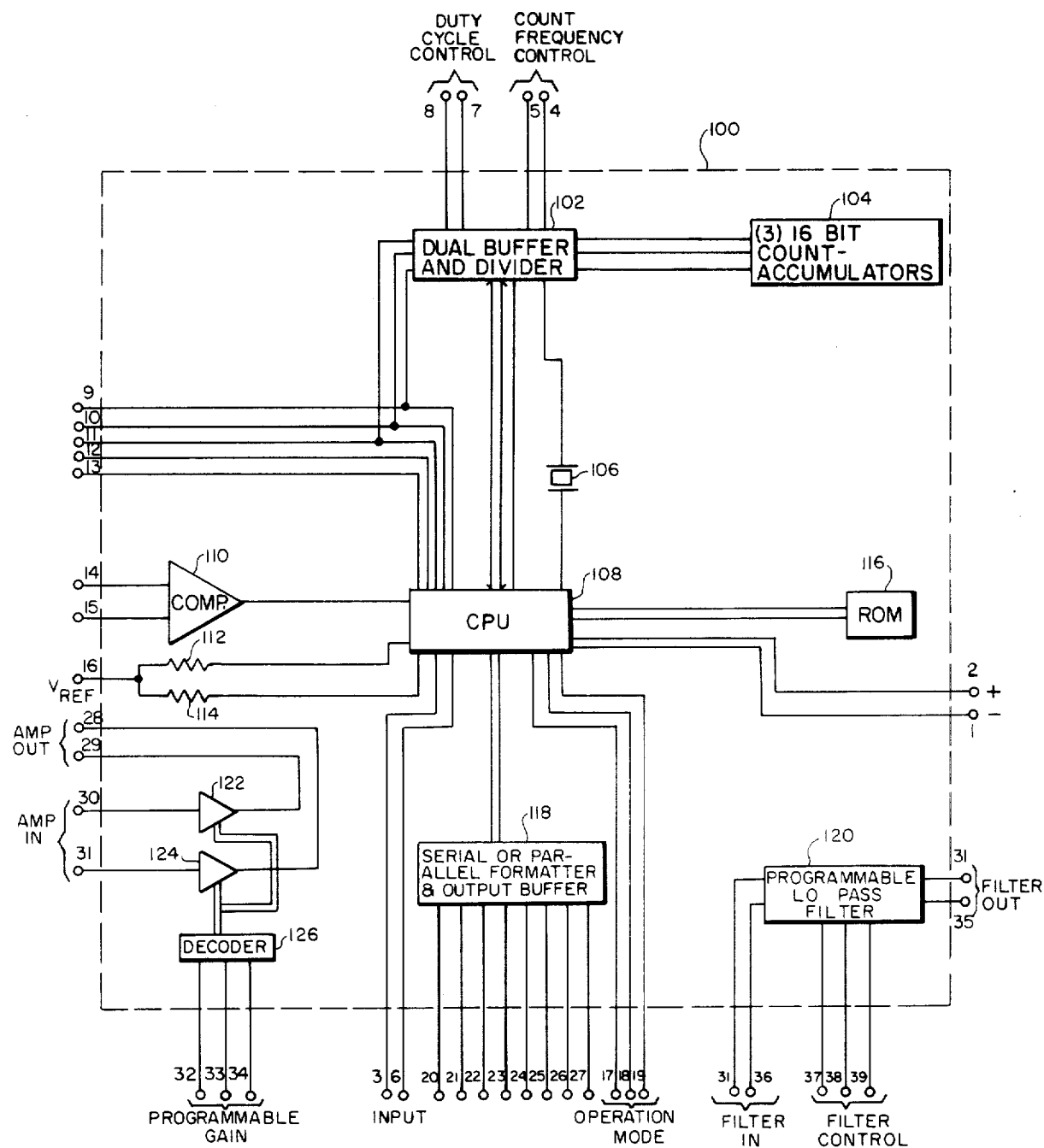
FIG. 2 shows in detail a block diagram of the microcomputer, its components, and the terminal connections for connecting it with the sensor and the master control unit.

FIG. 2 is a more detailed schematic for the specialized microcomputer circuitry. Again a CPU 108 is shown with connections to a ROM 116, a dual buffer and divider 102, a serial or parallel format and input/output buffer 118 for receiving the address and outputting data, a comparator 110, and resistors 112 and 114 connected to make up a voltage reference circuit. A high frequency crystal 106 for time control is connected between CPU 108 and dual buffer and divider 102. Power is received by the CPU through ports 1 and 2. The ROM is programmed in this embodiment to execute its stored programs via the CPU upon power energization through ports 1 and 2.

In addition, for special uses, two additional circuits are shown. The first is an auxiliary amplifying circuit which contains amplifiers 122 and 124 and a decoder 126. This circuit, which has input access through ports 30 and 31 and output through ports 28 and 29, provides the user the facility to wire his sensor through the amplifiers to increase signal gain if necessary. Decoder 126 selects the gain and is controllable through ports 32, 33 and 34.

A second auxiliary circuit provides low pass filtering capability to be applied to sensors. A programmable low pass filter 120 is provided with input ports 31 and 36 and output ports 31 and 35. Sensors measuring frequency may be connected through this circuit for filtering out undesirable frequency bands. Control of the filter is enabled through ports 37, 38 and 39.

Ports 4 and 5 to microcomputer 100 are for establishing count frequency control through the dual buffer and divider 102. Ports 7 and 8 establish duty cycle control through the dual buffer and divider. Ports 4, 5, 7, and 8 can receive their signals from the remote master control unit, but are usually hard wired for specific performance.

Ports 17, 18 and 19 can receive operational mode commands from the remote master control unit, but are also normally hard wired for selecting a part of the control program stored in the ROM for a specific performance.

The sensor circuit is connected to microcomputer 100 through the ports 9, 10, 11, 12, 13, 14, and 15. A voltage reference signal is provided at port 16. This voltage reference signal can be connected to the comparator at port 15 or made part of the sensor circuit. Ports 14 and 15 comprise the input ports to comparator 110. Comparator 110 is then output connected to CPU 108. Three sixteen-bit count accumulators 104 are connected through dual buffer and divider 102 to the sensor circuit ports 9, 10, and 11.

Figure 3:
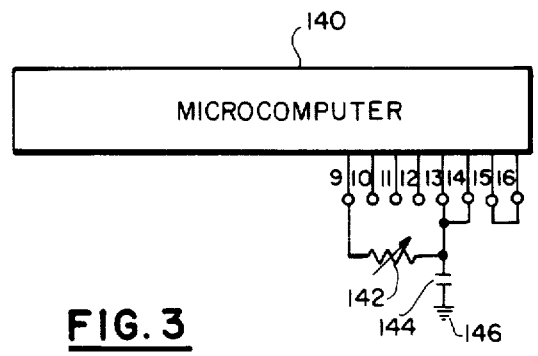
FIG. 3 shows the microcomputer connected to a sensor combination containing a thermister and a capacitor.

In FIG. 3, a simple mode of operation is shown with the microcomputer connected to a resistive type sensor 142. This method could be applied to existing arrays of matched thermisters. Resistor 142 is the thermister. The thermister is connected in series with a capacitor 144 which in turn is connected to ground 146. The voltage reference from terminal 16 of microcomputer 140 is connected directly to port 15, a first input port to the microcomputer's comparator. The connection point between resistor 142 and capacitor 144 is connected to the second input port 14 to the microcomputer's comparator.

Operation of this circuit occurs by applying a voltage at port 9 which causes the capacitor to charge according to the true characteristics of an RC circuit. When the voltage level at port 14 reaches the predetermined level of the reference voltage at port 16 the comparator emits a signal to the CPU to stop the count accumulator which has been accumulating count proportional to the elapsed time since the start of the charging cycle. The microcomputer can then transmit the recorded count as data of the thermisters measured value up the transmission line when directed to do so by the remote master controller.

Various modes of monitoring the sensor, recording the data, and transmitting it to the master controller are possible. One mode would, as described above, have the accumulated count sent to the master controller upon completion of recording the count. An alternate mode would be to program the microcomputer to store the count and wait until addressed again by the master controller, perhaps after a follow up measurement of that resistor has been taken again. It is consequently possible to power on the whole array to make a measurement from each sensor at the same time, and then transmit in turn the data before taking the next measurement.

For arrays with a single conductor transmission line the command address and/or data will be sent and received serially, and for systems with multiple signal lines the address and/or data will be sent and received in parallel bytes. The serial or parallel mode will depend on the operational mode command to the microcomputer which issues from the master control unit or, in the alternative, from the ROM. Parallel byte transmission requires added hard wired hook up between the microcomputer and the master control unit. Data transmission timing will also be controlled with the mode to be utilized.

With the thermisters in the mode described above matched the transmitted numbers can represent the temperature. The master controlling unit is programmed to convert the numbers to corresponding numbers of physical units. The master controller can also be programmed to detect changes in the magnitudes of the quantities measured by individual sensors and address particular sensors more often to track the changes in greater detail. If unmatched thermisters are used, the master controller needs to access a separate look up table for each thermister.

Figure 4:
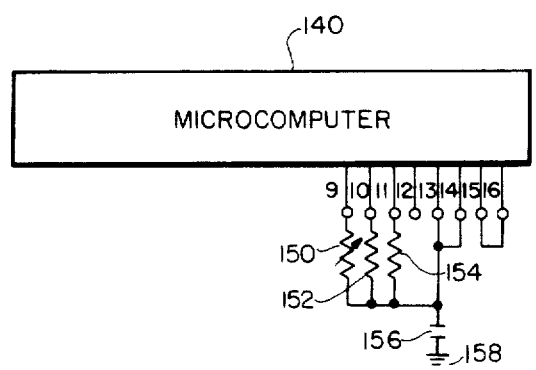
FIG. 4 shows the microcomputer connected to a sensor circuit containing a thermister, two limit resistors and a capacitor.

FIG. 4 shows the external components of the sensor circuit needed to implement a mode of operation that includes a measurement of the extremes of the dynamic range of the thermister with each temperature measurement. A thermister 150 is connected through port 9 to microcomputer 140. Extramum resistors 152 and 154 are connected to microcomputer 140 through ports 10 and 11. One of the extramum resistors represents the maximum of the dynamic range of thermister 150 while the second extramum resistor represents the minimum of the dynamic range. The ends opposite ports 9, 10, and 11 of the thermister 150 and resistors 152 and 154 are connected to capacitor 156 which has its opposite end connected to ground 158. Connections from a point between capacitor 156 and the various resistors is made to the comparator via port 14 within microcomputer 140 as described in FIG. 3.

The microcomputer will charge capacitor 156 through thermister 150 to first obtain a count representative of the reading on thermister 150, and will store this count following its measurement. Next, microcomputer 140 will connect in order the two extramum resistors, and measure and store their respective counts. The computer will perform simple arithmetic to obtain a number that represents the measured resistance as a fraction of the dynamic range defined by resistors 152 and 154. This method will give stable successive readings if all counts are started with capacitor 156 in the same state of discharge in order that the voltage difference between the start of the count and the interrupt is always the same. This can be accomplished by having capacitor 156 charged up on turn on, then discharging, for a constant delay time through port 13 before the first and successive counts.

Figure 5:
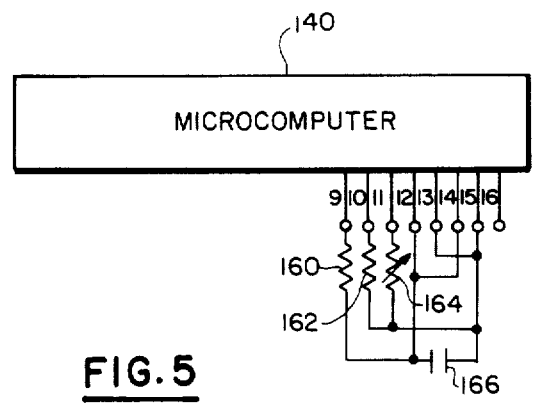
FIG. 5 shows an alternate circuit for the microcomputer in monitoring a thermister with two limit resistors and a capacitor.

FIG. 5 shows another method of giving the measurement as the fraction of the dynamic range. This method requires two counts and eliminates subtraction. Measurement time can be shorter, and the charging current is always d.c.

In this circuit one extramum resistor 160 is connected between port 9 and one terminal of capacitor 166. The second extramum resistor 162 is connected between port 10 and the opposite side of capacitor 166. Thermister 164 is connected betweenport 11 and the same side of capacitor 166 as is extramum resistor 162 connected. This second side of capacitor 166 is also connected to ports 13 and 15 of microcomputer 140. Port 15, of course, is one input to the microcomputer's comparator. The first side of capacitor 166 is connected to ports 12 and 14 of microcomputer 140, where port 14 is the second input to the microcomputer's comparator.

In the first phase of this operation, port 12 is made positive and port 13 is made common, putting a maximum charge on the capacitor. During this phase of the cycle ports 9, 10, and 11 are at high impedance. During the second phase of this method ports 12 and 13 go to high impedance, port 9 goes to common, and port 10 goes to positive, thereby discharging the capacitor from both sides until the comparator generates an interrupt and stops the count accumulating in one of the count accumulators.

A third measurement phase is identical with the first measurement phase. The last, and fourth, measurement phase is similar to the second measurement phase except now port II is made positive and port 10 is at high impedance, and the count is stored in a second of the count accumulators. When the count in the second count accumulator is divided by the count in the first count accumulator, the result is a number related to the measured value and the dynamic range. Calibration will provide numbers for a look up table in the master controller that converts the numbers to a physical measurement with units.

Figure 6:
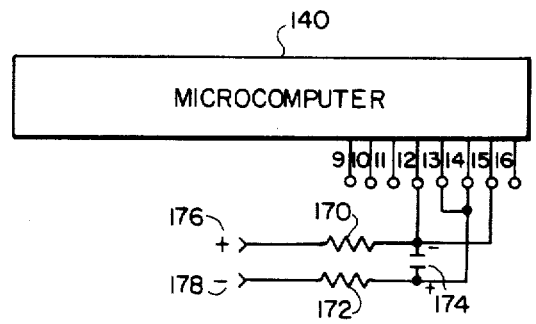
FIG. 6 shows the microcomputer connected to a full bridge type sensor that yields output voltages.

FIG. 6 shows an arrangement similar to FIG. 5 except that this circuit is used to get a count related to the output voltage of a full bridge sensor. The output voltages of the full bridge sensor are input to the sensor circuit at points 176 and 178. The positive input 176 feeds through resistor 170 to ports 12 and 15 on microcomputer 140. The negative input 178 feeds through resistor 172 into ports 13 and 14 on microcomputer 140. A capacitor 174 connects between ports 12 and 14 of the microcomputer.

For this operational mode resistors 170 and 172 are equal and large enough so that a positive voltage on port 13 and a negative voltage on port 12 will charge capacitor 174 with little load on the outputs 176 and 178 of the bridge of the sensor. When port 13 and 12 go to a high impedance, the count starts and is interrupted by the comparator checking voltage inputs at ports 14 and 15 as usual. In this case the count is again related to the magnitude of the measurement, and the master control unit is configured with a look up table to convert the count into a measurement corresponding to the proper physical units.

Figure 7:
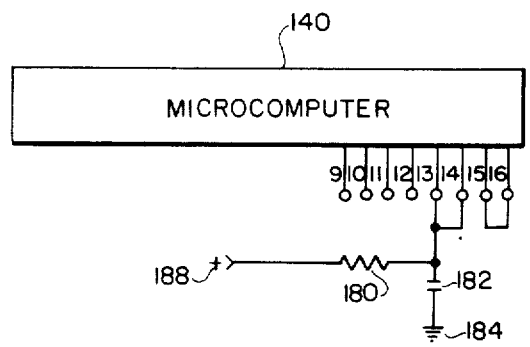
FIG. 7 shows the microcomputer connected with a sensor that has a voltage output from a half bridge.

FIG. 7 shows an arrangement that can be used with a sensor that has a voltage output from a half bridge. The half bridge voltage output is input at terminal 188 through a resistor 180 and into ports 13 and 14 of microcomputer 140. Capacitor 182 has one of its sides connected to terminals 13 and 14 of the microcomputer and to the output side of resistor 180. The other side of capacitor 182 is connected to ground 184.

The operation for this case is similar to that shown and described for FIG. 3 with the exception that resistor 180 corresponds in FIG. 7 with resistor 142 in FIG. 3. In FIG. 3, of course, resistor 142 was the thermister and it was controlled from the microcomputer terminal 9.

Many sensors have small dynamic ranges and their voltage output must be amplified to achieve the best resolution for the measurements. As shown in FIG. 2 and described previously, a separate amplifier wiring circuit can be installed on the microcomputer to allow wiring a sensor through the amplifier for increasing the gain of the circuit. Similarly, as was shown in FIG. 2, certain frequency sensitive sensors may be wired through the programmable low pass filter 120 to meet specified measurement requirements.

Figure 8:
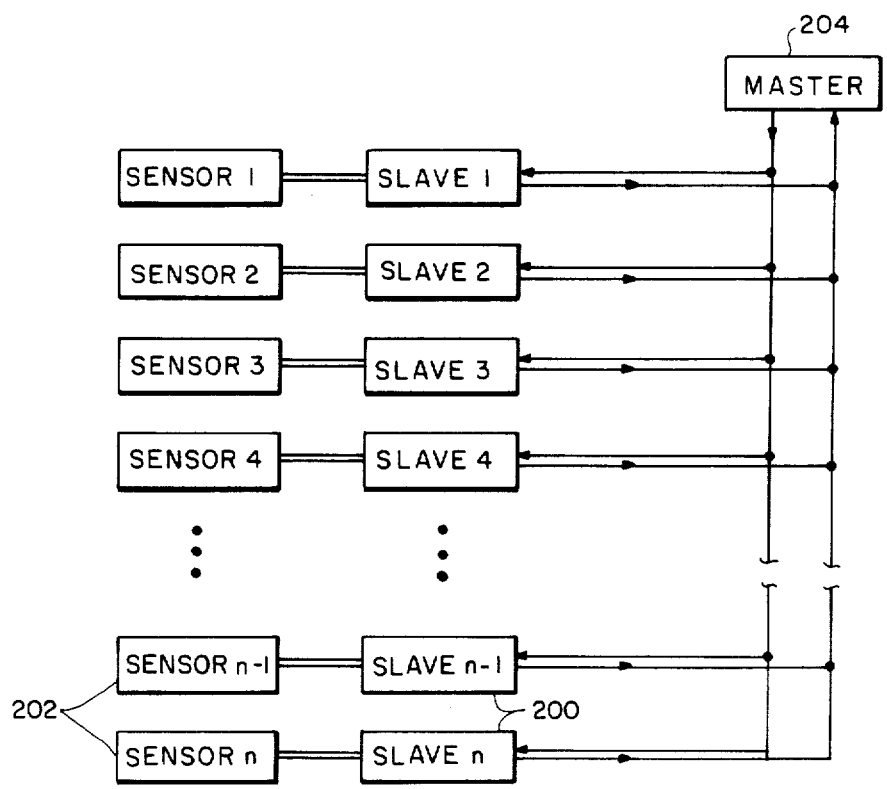
FIG. 8 shows a block diagram of a plurality of microcomputers slaved to their respective sensors and connected with a master control unit.

FIG. 8 shows the manner for associating each microcomputer circuit with a sensor and communicating with a remote master control unit. Each of a plurality of the microcomputer circuits 200 is slave connected with its respective sensor 202. Each slaved microcomputer is connected with the remote master unit 204. Command instructions and power are fed from the master control unit to each microcomputer, and the data monitored and stored by each microcomputer and sensor combination is programmed to be transmitted to the master control unit for further processing and display.

One particularly useful alternative would be to use an EPROM in place of ROM 72, 116. The use of an EPROM provides the capability to adjust or change operational control programs which increases the versatility of the system. This alternative also carries the disadvantage of requiring more size and hard wired support.

Obviously many modifications and variations of the present invention are possible in the light of the above teachings. It is therefore to be understood that within the scope of the appended claims the invention may be practiced otherwise than as specifically described.

What is claimed is:

1. A universal microcomputer circuit for dedicated monitoring of individual sensors in an array of sensors, wherein a separate universal microcomputer is connected to each of said sensors in the chain, said universal microcomputer comprising:
   a central processing unit;
   memory means connected to the central processing unit, said memory means containing instructions and data;
   means connected to the central processing unit for controlling timing of the circuit;
   means for accumulating a count;

first buffering means connected between the central processing unit and a control input for buffering command signals coming in through the control input from a master control unit, said buffering means also connected to the means for accumulating a count;

second buffering means connected between the central processing unit and a data output terminal for buffering the data output from the central processing unit to the master control unit;

comparing means connected with its output to the central processing unit, for comparing a voltage difference between two inputs to said comparing means;

a voltage reference connected to a first input of said comparing means;

a sensor circuit connected with its first end to the central processing unit and the first buffering means, and with its second end having a voltage output connected to a second input to the comparing means.

2. An apparatus according to claim 1 wherein the memory means comprises:
a read only memory.

3. An apparatus according to claim 2 wherein the means for accumulating a count comprises:
a plurality of sixteen-bit count accumulators.

4. An apparatus according to claim 3 wherein the first buffering means comprises:
a dual buffer and divider circuit.

5. An apparatus according to claim 4 wherein the second buffering means comprises:
a serial/parallel formatter and output buffering circuit.

6. An apparatus according to claim 5 wherein the sensor circuit further comprises:
a resistive element sensor with its first end connected to the central processing unit to receive power and operational control during measurement, and its second end connected to the second input of the comparing means; and
a capacitor connected with its first side at ground potential and its second side connected to the second input of the comparing means.

7. An apparatus according to claim 5 wherein the sensor circuit further comprises:
a resistive element sensor connected with its first end to the central processing unit and its second end to the second input of the comparing means;
a lower limit resistor connected with its first end to the central processing unit and its second end to the second input of the comparing means;
an upper limit resistor connected with its first end to the central processing unit and its second end to the second input of the comparing means; and
a capacitor with its first side connected to ground and its second side connected to the second input of the comparing means.

8. An apparatus according to claim 5 wherein the sensor circuit further comprises:
a resistive element sensor connected with its first end to the central processing unit and its second end connected to the first input of the comparing means, said second end also connected to the central processing unit whereby power may be selectively applied to this end of said resistive element sensor;

an upper limit resistor with its first end connected to the central processing unit and its second end connected to the first input of the comparing means, said second end also connected to the central processing unit whereby power may be selectively applied to this end of said upper limit resistor;

a lower limit resistor with its first end connected to the central processing unit and its second end connected to the second input of the comparing means, said second end also connected to the central processing unit whereby power may be selectively applied to this end of said lower limit resistor;

a capacitor with its first side connected to the second end of the lower limit resistor and to the second input of the comparing means, and with its second side connected to the first input of the comparing means, said second side of the capacitor also being connected to a terminal of the central processing unit wherein power can be selectively generated on this terminal.

9. An apparatus according to claim 5 wherein the sensor circuit further comprises:
a first input terminal to receive a positive voltage;
a first resistor connected to said first input terminal on its first end, and connected at its second end to the first input of the comparing means, said second end also connected to a first terminal of the central processing unit whereby power or impedance can be selectively applied;
a second input terminal to receive a negative voltage;
a second resistor connected to the second input terminal to receive a negative voltage at its first end and connected at its second end to the second input of the comparing means, said second end also connected to a second terminal of the central processsing unit whereby power or impedance can be selectively applied; and
a capacitor connected between the second ends of the first and second resistors.

10. An apparatus according to claim 5 wherein the sensor circuit further comprises:
an input terminal to receive a positive voltage;
a resistor with its first end connected to the positive input terminal, and its second end connected to the first input of the comparing means, said second end also connected to a terminal of the central processing unit whereby impedance levels or power can be selectively applied; and
a capacitor connected between the second end of the resistor and ground.

11. An apparatus according to claim 5 wherein the universal microcomputer circuit further includes an amplifying circuit which comprises:
means for amplifying a sensor signal, said means containing input terminals for connection to the individual sensors and output terminals for connection to the sensor circuit; and
a programmable gain decoder connected to the amplifying means whereby the amount of gain can be programmed in a preselected manner.

12. An apparatus according to claim 11 wherein the universal microcomputer circuit further includes a low pass filter circuit which comprises:
a programmable low pass filter with input and output connections for attachment in the sensor circuit, and with filter control connections for connection with the master control unit for preprogramming the operating conditions of said filter.

13. An apparatus according to claim 5 wherein the universal microcomputer circuit further comprises:
   an electrical connection cable of preselected length attached at one end to a power port, to a data output port, and a control input port of the microcomputer circuit; and
   the master control unit located at a remote preselected distance, said master control unit being connected to the other end of the electrical cable, said master control unit being selectively set to send command instructions to the universal microcomputer circuit, and also to receive data transmitted from said universal microcomputer circuits.

14. An apparatus according to claim 13 wherein said master control unit further comprises:
   connections through a transmission cable to a plurality of universal microcomputer circuits which are each attached to a single sensor circuit.

15. An apparatus according to claim 5 wherein the memory means comprises:
   an erasable programmable read only memory.

16. A method using a universal microcomputer circuit according to claim 6 which comprises the steps of:
   charging a capacitor through a series connected variable resistive element sensor;
   accumulating a numerical count proportional to the elapsed time during the charging step;
   monitoring the voltage at a point located between the variable resistive element sensor and the capacitor, said monitored voltage being fed to a first input terminal of a comparator;
   feeding a preset reference voltage to the second input of said comparator;
   comparing the two input voltages with said comparator;
   stopping the accumulating numerical count when the compared voltages are equal, whereby said count represents the time to charge the resistance-capacitance circuit to the reference voltage level which in turn is dependent upon the variable value of the resistive sensor;
   processing the accumulated numerical count value to obtain the value of the resistance for the variable resistive element; and
   converting the value for the resistive element into the equivalent value of the desired physical parameter being measured by the resistive element sensor.

17. A method using a universal microcomputer circuit according to claim 7 which comprises the steps of:
   charging a capacitor connected in series through a variable resistive element sensor;
   accumulating a numerical count proportional to the elapsed time during the charging step;
   monitoring the voltage at a point located between the variable resistive element and the capacitor, said monitored voltage being fed to a second input terminal of a comparator;
   feeding a preset reference voltage to the first input of the comparator;
   comparing the two input voltages with said comparator;
   stopping the accumulating numerical count when the compared voltages are equal, whereby said count represents the time to charge the resistance-capacitance circuit to the reference voltage level which in turn is dependent upon the variable value of the resistive sensor;
   storing the accumulated count for later processing;
   charging the capacitor through a first fixed value resistor which has a resistance value set to represent the upper limit of the dynamic range to be monitored by the variable resistive element sensor;
   accumulating a numerical count proportional to the elapsed time during the previous charging step;
   monitoring the voltage at a point located between the first fixed value resistor and the capacitor, said monitored voltage being fed to a second input terminal of said comparator;
   comparing the monitored voltage of the previous step with the preset reference voltage fed to the first input of the comparator;
   stopping the accumulating numerical count when the compared voltages are equal, whereby said count represents the time to charge the resistance-capacitance circuit to the reference voltage level which in turn is dependent upon the value of the first fixed resistor;
   storing the accumulated count corresponding to the first fixed resistor;
   charging the capacitor through a second fixed value resistor which has a resistance value set to represent the lower limit of the dynamic range to be monitored by the variable resistive element sensor;
   accumulating a numerical count proportional to the elapsed time during the previous charging step;
   monitoring the voltage at a point between the second fixed resistor and the capacitor, said monitored voltage being fed to a second input terminal of said comparator;
   comparing the monitored voltage of the previous step with the preset reference voltage which is fed to the first input of the comparator;
   stopping the accumulating numerical count when the compared voltages are equal, whereby said count represents the time to charge the resistance-capacitance circuit to the reference voltage level which in turn is dependent upon the value of the second fixed resistor;
   storing the accumulated count corresponding to the second fixed resistor;
   computing the value of (the stored count representing the second fixed resistor minus the stored count representing the variable resistive element sensor) divided by (the stored count representing the second fixed resistor minus the stored count representing the first fixed resistor), whereby the answer given is a measurement value of the variable resistive element sensor as a fraction of the dynamic range defined by the first resistor and the second fixed resistors; and
   converting this fractional measurement into the desired value of the physical parameter being measured by the variable resistive element sensor.

18. A method using a universal microcomputer circuit according to claim 8 which comprises the steps of:
   charging a capacitor by applying a positive voltage to its first side and a negative potential to its second side;
   establishing the circuit configuration including the capacitor charged in the first step, said configuration comprising:
      a first fixed value resistor connected to the positively charged side of the capacitor, said first fixed value resistor having a resistance value set to represent the upper limit of the dynamic range for the measurement to be taken;

a second fixed value resistor connected to the negative side of the charged capacitor, said second fixed value resistor having a resistance value set to represent the lower limit of the dynamic range for the measurements to be taken;

a comparator connected with its first voltage input attached to a point between the positive side of the charged capacitor and the first fixed value resistor, and its second voltage input connected between the negative side of the charged capacitor and the second fixed value resistor;

a first counter connected to the output of the comparator, said first counter to accumulate numerical count representing elapsed time of discharge of the presently charged capacitor;

applying a positive voltage at the end of the second fixed value resistor which is opposite to that resistor's end attached to the charged capacitor, and applying a negative voltage at the end of the first fixed value resistor which is opposite that resistor's end attached to the charged capacitor;

starting said first counter to accumulate count simultaneously with the initiation of the voltage difference across the resistance-capacitance circuit in the prior step;

comparing the voltage inputs to the comparator until each voltage input become equal during the period that the capacitor is discharging;

stopping the accumulating count in the first counter when the voltage inputs to the comparator are equal;

storing this accumulated count for later processing;

repeating the above steps with the exception that the second fixed resistor is replaced with a variable resistive element sensor, said variable resistive element sensor monitoring the physical variable of interest in the measurement, and with the further exception that the second accumulated count is recorded and stored in a second counter;

dividing the stored accumulated count from the second counter by the stored accumulated count from the first counter; and converting the ratio of the divided accumulated counts into the desired value of the physical parameter being measured by the variable resistive element.

19. A method using a universal microcomputer circuit according to claim 9 wherein the output voltage of a full bridge sensor may be monitored, said method comprising the steps:

charging a capacitor which is connected across the input voltage terminals from the full bridge sensor, said capacitor being charged from a power source controlled by the universal microcomputer circuit in a manner that its positive side is connected with the negative input from the full bridge sensor and its negative side is connected with the positive input from the full bridge sensor, and said capacitor being insulated from the voltage input of the full bridge sensor during the charging of said capacitor;

monitoring the voltage difference across the capacitor by a comparator such that one voltage input to the comparator is connected to one side of the capacitor while the second voltage to the comparator is connected to the opposite side of said capacitor;

exposing the charged capacitor to the voltages being input from the full bridge sensor in a manner that the positive side of the full bridge sensor voltage feeds to the negatively charged side of the capacitor and the negative voltage input from the full bridge sensor feeds to the positively charged side of the capacitor;

starting a count accumulating simultaneously with the exposing of the capacitor to the full bridge sensor voltages;

monitoring the voltage across the capacitor with the comparator simultaneously with the accumulating count;

stopping the accumulating count when the voltages monitored by the comparator inputs are equal;

storing the accumulated count for further processing; and converting the accumulated count into the desired physical parameter being measured by the full bridge sensor.

20. A method using a universal microcomputer circuit according to claim 10 wherein a voltage output from a half bridge sensor is to be monitored, said method comprising the steps:

applying the positive voltage output of the half bridge sensor through a preselected fixed resistor to one side of a capacitor, said capacitor having its other side set at ground potential;

starting a count accumulating simultaneously with exposing of the capacitor to the half bridge voltage output;

monitoring the voltage at a terminal located between said fixed resistor and the high side of said capacitor, said monitored voltage being fed to a first input terminal of a comparator;

feeding a preset reference voltage into the second input of the comparator;

comparing the two input voltages with the comparator;

stopping the accumulating count when the voltages are equal, whereby said count represents the time to charge the resistance-capacitance circuit to the reference voltage level which in turn is dependent upon the voltage output of the half bridge sensor;

processing the accumulated count to obtain the value of the voltage output of the half bridge sensor; and converting the value of the voltage of the half bridge sensor into the value of the desired physical quantity being measured by the half bridge sensor.

* * * * *